United States Patent [19]

Kwon

[11] Patent Number: 5,768,546
[45] Date of Patent: Jun. 16, 1998

[54] METHOD AND APPARATUS FOR BI-DIRECTIONAL TRANSFER OF DATA BETWEEN TWO BUSES WITH DIFFERENT WIDTHS

[75] Inventor: Ki-Young Kwon, Kyungki-Do, Rep. of Korea

[73] Assignee: LG Semicon Co., Ltd., Cheongju, Rep. of Korea

[21] Appl. No.: 658,424

[22] Filed: Jun. 5, 1996

[30] Foreign Application Priority Data

Dec. 23, 1995 [KR] Rep. of Korea .................. 1995/55619

[51] Int. Cl.[6] .................................................. G06F 13/00
[52] U.S. Cl. ............................................. 395/307; 395/886
[58] Field of Search ................................. 395/306–309, 395/886

[56] References Cited

U.S. PATENT DOCUMENTS

| | | | |
|---|---|---|---|
| 4,683,534 | 7/1987 | Tietjen et al. | 395/307 |
| 4,716,527 | 12/1987 | Graciotti | 395/500 |
| 5,280,598 | 1/1994 | Osaki et al. | 395/307 |
| 5,293,381 | 3/1994 | Choy | 370/99 |
| 5,345,559 | 9/1994 | Okazaki et al. | 395/250 |
| 5,499,344 | 3/1996 | Elnashar et al. | 395/250 |
| 5,537,624 | 7/1996 | Whitesell | 395/872 |
| 5,559,969 | 9/1996 | Jennings | 395/307 |

*Primary Examiner*—Jack B. Harvey
*Assistant Examiner*—David A. Wiley
*Attorney, Agent, or Firm*—Fleshner & Kim

[57] ABSTRACT

A data transmission system between two system buses and a method therefor are capable of bi-directionally transmitting data between two bus systems whose word widths are different. The data word from a first system bus is converted to a data word width of a second system bus, and the converted data is outputted to the second system. The data word from the second system bus is converted to a data word width of the first system bus, and the converted data is outputted to the first system. The data transmission system includes first and second system interfaces, first and second FIFO buffers, first and second FIFO controllers, first and second latches, and first and second selectors correspondingly coupled between the first and second system buses to allow bi-directional transfer of data.

14 Claims, 2 Drawing Sheets

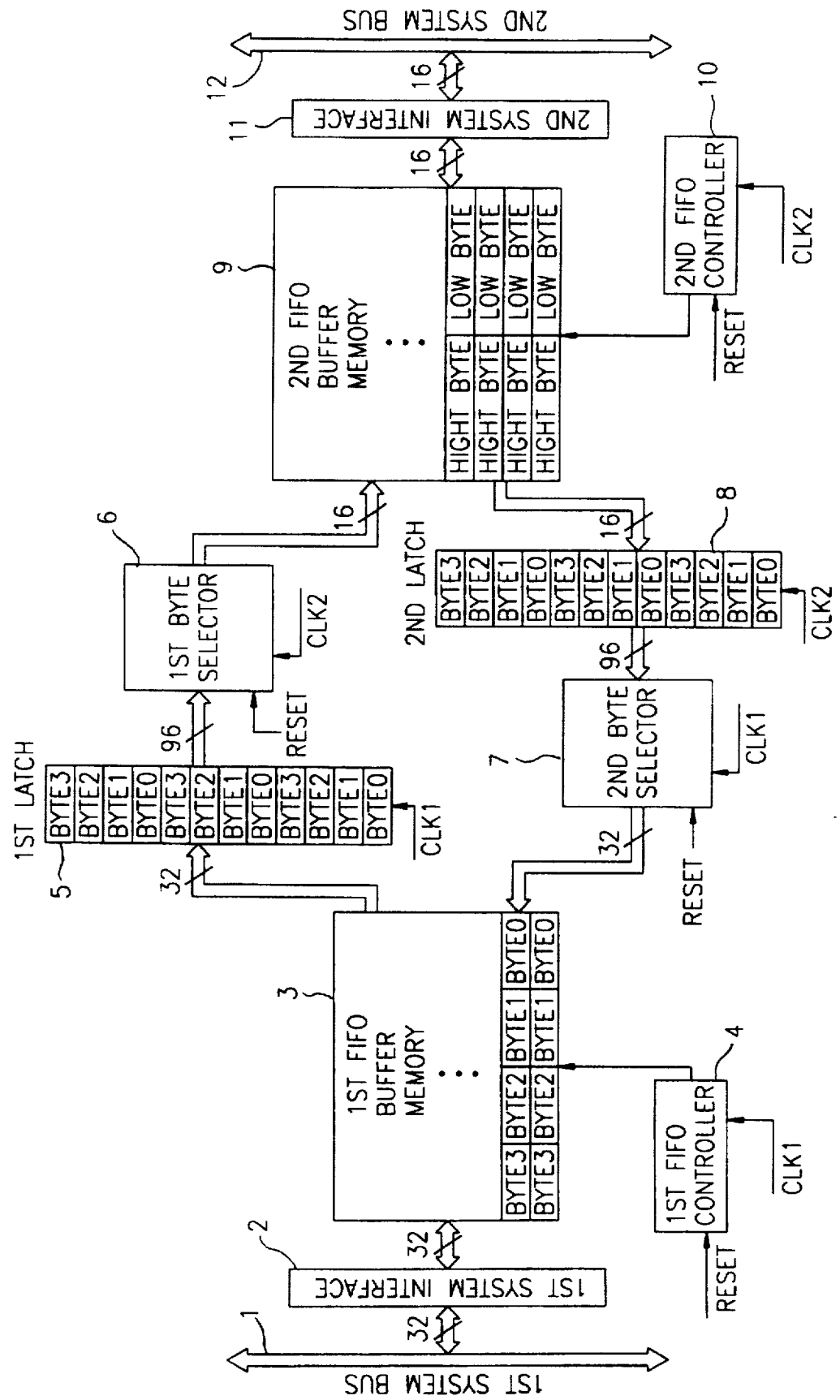

METHOD AND APPARATUS FOR BI-DIRECTIONAL TRANSFER OF DATA BETWEEN TWO BUSES WITH DIFFERENT WIDTHS

TECHNICAL FIELD

The present invention relates to a data transmission system between two system buses and a method thereof, and more particularly, to a data transmission system and method capable of bidirectionally transmitting data between two bus systems with different word width.

BACKGROUND ART

Generally, there are two types of data words which are supplied from a wider bus to a narrower bus. First is a full word in which valid data occupy the full width of bus, and the second is a partial word in which valid data partially occupy the width of bus. Regardless of the width of the word, all data words are written completely in a FIFO buffer memory. A status tag bit or a hole is properly marked according to whether the data to be written are valid or not. When transmitting the partial word, the valid data included in the word is transmitted to the bus, and the invalid data is not transmitted to the bus. For such a purpose, a byte tracker is installed on the output terminal of the buffer memory to determine the transmission of the byte. In other words, when each word is read from the FIFO buffer memory, the byte tracker detects the hole information, and then transmits the valid data of the word or cuts off the invalid data of the word.

FIG. 1 illustrates a conventional data transmission system. A system bus 34 is a 32-bit wide data bus. A system interface 48 connects the system bus 34 to a FIFO buffer memory 42, and supplies an n-byte data word 62 to the FIFO buffer memory. The interface 48 transfers an n-bit hole data from the system bus 34 together with the data word 62 to the FIFO buffer memory 42. Accordingly, the FIFO buffer memory 42 stores the data word 62 and the hold in the format shown in FIG. 1, where the data word 62 is four bytes, the hole, i.e., the status tag bit of each byte, is four bits, and each four-byte data word is 32 bits.

An n:1 multiplexer 64 is connected through a 32-bit wide bus 66 to the output terminal of the FIFO buffer memory 42. The multiplexer 64 multiplexes the valid data bytes from the four-byte data word 62 output from the FIFO buffer memory 42, and outputs the multiplexed data bytes to an eight-bit bus 68. A byte tracker 70 controls the multiplexer 64, and determines which byte should be transmitted to the output bus 68 from among the four-byte data words 62 using the information of the four-bit hole input from the FIFO buffer memory 42.

In the FIFO buffer memory 42 of FIG. 1, when the marked hole is "0", the corresponding byte is valid. When the marked hole is "1", the corresponding byte is invalid. For example, if the bytes V0, V1, V2 and V3 of the first row of the FIFO buffer memory 42 and the holes 0, 0, 0 and 0 are respectively input to the multiplexer 64 and the byte tracker 70, the byte tracker 70 determines the bytes V0, V1, V2 and V3 are all valid according to the information of the hold.

Accordingly, the byte tracker 70 outputs a controlling signal COL indicating that the input bytes are all valid to the multiplexer 64. The multiplexer 64 successively outputs the four-byte data words V0 to V3 input from the FIFO buffer memory 42 to the bus 68 according to the control signal COL of the byte tracker 70.

After an operation corresponding to the first row is finished, the byte tracker 70 outputs a control signal called a readword to the FIFO buffer memory 42. The FIFO memory 42 respectively outputs the four-byte data words X, V4, V5 and V6 of the second row and the corresponding holes 1, 0, 0 and 0 to the multiplexer 64 and the byte tracker 70. The multiplexer 64 selects only valid bytes V4, V5 and V6 in the above-described method, and outputs the selected bytes to the bus 68.

The valid bytes supplied to the bus 68 are used in a parallel form by an external circuit (not shown), or converted into a serial bit stream by a parallel/serial converted 69. When the eight-bit unit, that is, when the byte output in units of one byte is converted into a series bit stream by the parallel/serial converter 69, the parallel/serial converter 69 converts the byte of eight bits into one bit data stream, and supplies the data stream through an element, such as a Manchester encoder/decoder 36 to another bus. When the parallel/serial conversion of the corresponding byte is finished, the parallel/serial converter 69 outputs a READ signal to the multiplexer 64 for conversion of the next byte.

A clock signal, a reset signal RESET and a read byte signal is supplied to the byte tracker. The clock signal is provided to synchronize the system. The reset signal determines a point of time when the byte tracking system is reset-such as a power on reset. The read byte signal determines the unit of data output to the bus 68. In FIG. 1, one byte of data is outputted to the bus 68.

However, in case of transmitting data between two buses whose bus widths or data word widths are different, the conventional data transmission system is incapable of bi-directional data transfer. The data is transferred only from the wider bus to the narrower bus. Hence, the conventional system is not suitable for a bi-directional data transmission, and not readily suitable to a system which uses multi-clocks.

SUMMARY OF THE INVENTION

An advantage of the invention is in providing a system capable of bi-directional data transmission between two buses having different data word widths.

Another advantage of the present invention in providing a system using multi-clock signals to transmit data words of different widths between buses of different widths.

The above and other advantages of the invention are achieved, at least in part by a data transmission system for transmitting data words between first and second system buses, the first system bus transmitting a first data word of a plurality of first bytes through a first system interface in synchronization with a first clock signal, and the second system bus transmitting a second data word of a plurality of second bytes through a second system interface in synchronization with a second clock signal, the data transmission system comprising: a first memory for one of storing the data word outputted from the first system bus through the first system interface, and outputting to the first system bus the data word stored in the first memory through the first system interface; a first latch for latching the data word from the first memory in a first predetermined number of byte; a first selector for selecting the bytes latched in the first latch in a second predetermined number of bytes; a second memory for at least one of outputting the bytes from the first selector through the second system interface to the second system bus and storing the data word outputted from the second system bus through the second system interface; a second latch for latching the data word from the second memory in a third predetermined number of bytes; a second selector synchronized with the first clock signal, the second selector selecting the bytes latched in the second latch in a fourth predetermined number of bytes, the second selector outputting the selected bytes to the first memory; a first controller to control at least one of latching of the data word from the first system bus to the first memory, into the first latch, and outputting of the data word from the second selector to the first system bus through the first memory; and a second controller synchronized with the second clock signals, the controller unit controlling at lest one of outputting the data words from the first selector to the second system bus through the second memory, and outputting the data words from the second system bus to the second latch through the second memory.

The present invention also may be achieved in part by a method for transmitting data in a data transmission system for transmitting data word of a plurality of bytes between the first and second system buses which are respectively synchronized with first and second clock signals and respectively having different data word widths, the method comprising the steps of: (1) converting a width of data word from the first system bus into a width of a data word of the second system bus, and outputting the converted data word to the second system bus; and (2) converting a width of data word from the second system bus into a width of a data word of the first system bus and outputting the converted data word to the first system bus.

The above and other advantages are also achieved, at least in part by a system for bi-directional transfer of data between a first bus of n-byte data word width and a second bus of m-byte data word width, where n and m are integers, comprising: a first storage arrangement to store n-byte data word from the first bus; a second storage arrangement to store m-byte data word from the second bus; means for controlling the first and second storage arrangements; and means for transferring m-byte of data from the first storage arrangement to the second storage arrangement, and for transferring n-byte of data from the second storage arrangement to the first storage arrangement.

Additional advantages, objects and other features of the invention will be set forth in part in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 is a block diagram of a data transmission system of the present invention.

BEST MODE OF THE PREFERRED EMBODIMENT

Figure 1:
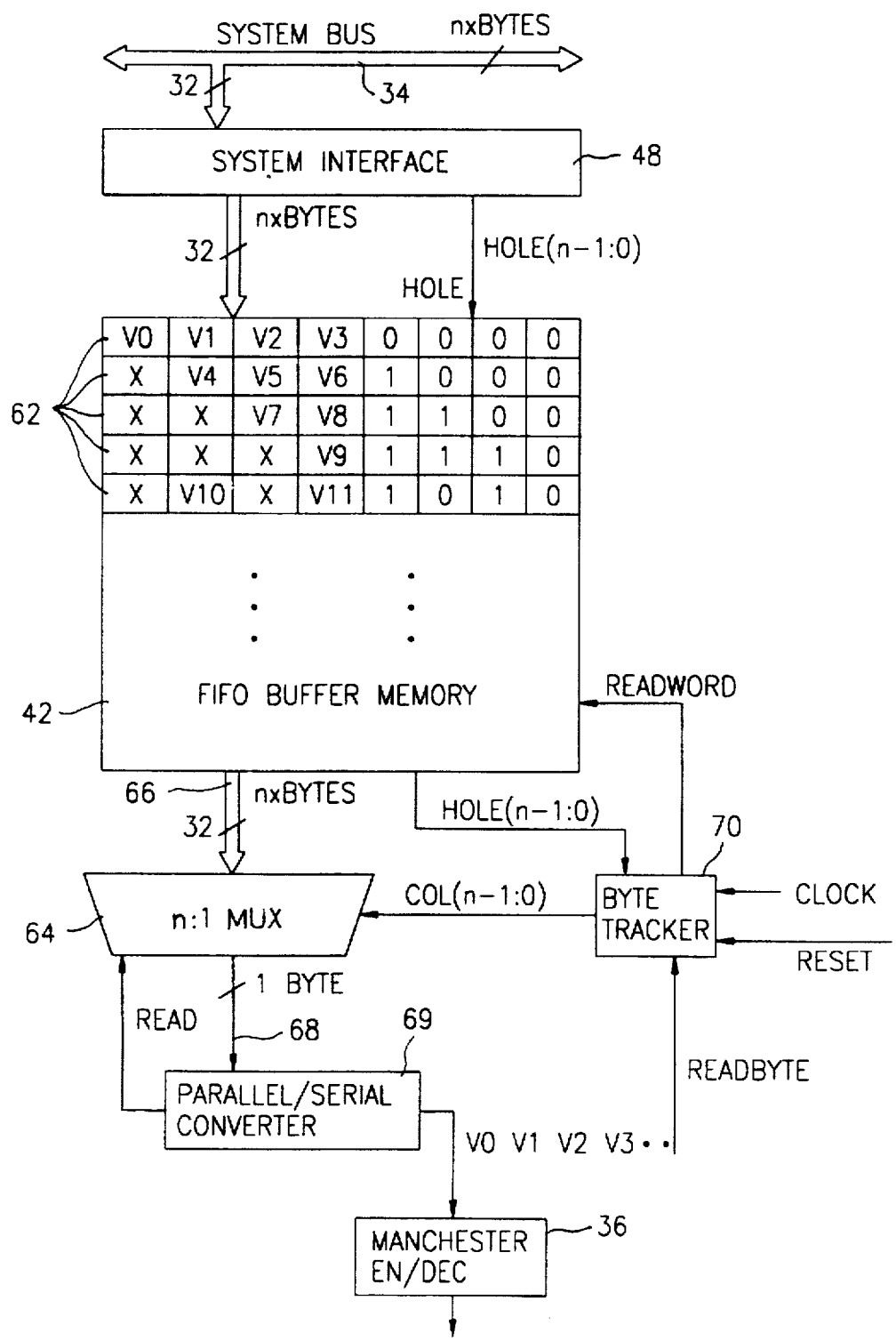
FIG. 1 is a block diagram of a conventional data transmission system.

FIG. 2 is a block diagram of a data transmission system in accordance with the invention. The data transmission system includes a first system bus 1 for transmission of a data word of, e.g., 32 bits, and a second system bus 12 for transmission of a data word of, e.g., 16 bits. A first system interface 2 connects a first system bus 1 to supply the data word in units (a predetermined number) of, e.g., four bytes, to a first FIFO buffer memory 3. The first FIFO buffer memory 3 stores and outputs the data word in units of four bytes.

A first FIFO controlling unit (controller) 4 controls the first buffer memory 3, and a first latch 5 latches the data word from the first FIFO buffer memory 3, in units of bytes. A first byte selecting unit 6 selects a predetermined number of bytes from the first latch 5 corresponding to the width of data word of the second system bus 12, and a second FIFO buffer memory 9 which is placed between the first byte selection unit 6 and a second system interface 11 stores and outputs the data word in units of, e.g., two bytes.

A second FIFO controlling unit 10 controls the second FIFO memory 9, and the second system interface 11 supplies the data word in units of, e.g., two bytes between the second FIFO buffer memory 9 and the second system bus 12. A second latch 8 latches the data word input from the second FIFO memory 9 in units of bytes, and a second byte selection unit 7 selects a predetermined number of bytes from the second latch 8 corresponding to the width of the data word of the first system bus 1, to transmit the selected bytes to the first FIFO buffer memory 3.

The first FIFO controlling unit 4 controls the transmission of the data word input from the first system bus 1 to the first FIFO buffer memory 3 and the latching of the data word in the first latch 5. The controller 4 also controls the transmission of the data word input from the second byte selecting unit 7 to the first FIFO buffer memory 3 for outputting the data word to the first system bus 1. Similarly, the second FIFO controlling unit 10 controls the transmission of the data word input from the first byte selecting unit 6 to the second FIFO buffer memory 9, and to the second system bus 12 through the second system interface in case of transmitting the data word from the first system bus 1 to the second system bus 12. Conversely, the second FIFO controller 10 controls the transfer of the data word input from the second FIFO buffer memory 9 to the second latch 8 in case of transmitting data word from the second system bus 12 to the first system bus 1.

When transmitting data from the first system bus 1 of a 32-bit data word width to the second system bus 12 of a 16-bit data word width, four bytes of the data (i.e., each byte contains 8 bits) are input from the first 32-bit wide system bus 1 through the first system interface 2 to the first FIFO buffer memory 3, and then output to the first latch 5. The first FIFO buffer memory 3 is controlled according to the control signal from the first FIFO controlling unit 4, which is initialized by a reset signal RESET and synchronized with a first clock signal CLK1. The first latch 5 synchronized with the first clock signal CLK1 1 successively latches the four-byte data word output from the first FIFO buffer memory 3. In this example, the first latch 5 may latch three data words (12 bytes=96 bits).

The first byte selecting unit 6, synchronized with the second clock signal CLK2, selects two bytes from the twelve bytes of data words latched to the first latch 5, where the two bytes correspond to the data word width of the second system bus 12. The first byte selecting unit 6 outputs the selected bytes to the second FIFO buffer memory 9 and the second FIFO buffer memory 9 successively receives the two bytes data word to output the data word to the second system interface 11. The second FIFO buffer memory 9 is controlled by the controlling signal of the second FIFO controlling unit 10, which is initialized by the reset signal RESET and synchronized with the second clock signal CLK 2. The second system interface 11 outputs the two bytes data word output from the second FIFO buffer memory 9 to the second system bus 12. In such a manner, the 32-bit wide data output from the first system bus 1 is transmitted to the second system bus 16 of 16-bit data word width.

When transmitting data from the second system bus 12 of a 16-bit data word to the first system bus 1 of a 32-bit data word, the two bytes of a data word (i.e., each byte contains 8 bits) are input from the second system bus 12 of 16-bit width through the second system interface 11 to the second FIFO buffer memory 9, and then output to the second latch 8. The second FIFO buffer memory 9 is controlled according to the control signal from the second FIFO controlling unit 10. The second latch 8, synchronized with the second clock signal CLK2, successively latches the two-byte data word output from the second FIFO buffer memory 9. In this example, the second latch 8 is intended to latch six data words (12 bytes=96 bits).

The second byte selecting unit 7, synchronized with the first clock signal CLK1, selects four bytes data word corresponding to the data word width of the first system bus 1, among the twelve bytes latched into the second latch 8, and outputs the selected data word to the first FIFO buffer memory 3. The first FIFO buffer memory 3 successively receives the four bytes of the data word output from the second byte selecting unit 7, and outputs the data word to the first system interface 2. The first FIFO buffer memory 3 is controlled by the controlling signal of the first FIFO controlling unit 4. The first system interface 2 outputs the four-byte data word output from the first FIFO buffer memory 3 to the first system bus 1. In such a manner, the 16-bit wide data output from the second system bus 12 is transmitted to the first 32-bit wide system bus 1.

In this example, the first system bus 1 may be a system bus for communicating modules such as a peripheral component interconnect PCI bus in a general computer system. The first clock signal CLK1 is a clock signal for synchronizing a device related to a first system bus 1. However, the second system bus 12 may be a system bus for communicating the peripheral devices in a general computer system, and the second clock signal CLK2 is a clock signal for synchronizing the device related to the second system bus 12.

Additionally, the first 12-byte deep latch 5 of FIG. 2 can be replaced at least by a 2-byte deep latch because the second FIFO buffer memory 9 processes the data word in units of two bytes to transmit the data word to the second 16-bit wide system bus 12. On the other hand, because the first FIFO buffer memory 3 transmits data in units of four bytes to transmit the data word to the first 32-bit wide system bus 1, the second latch 8 requires at least four bytes deep data.

As described above in detail, the data transmission system and the method therefor according to the invention are capable of a bi-directional data transmission between the system buses whose data have different widths respectively, and advantageous to be applied to a system using a multiclock. The foregoing embodiment is merely exemplary and not to be construed as limiting the present invention. The present invention can be readily applied to other type of systems. One of ordinary skill in the art can use the teachings of the present invention to other devices requiring bi-directional transfer of data between buses with different data word width. The description of the present invention is intended to be illustrative, and not limiting the scope of the claims. Many alternatives, modifications and variations will be apparent to those skilled in the art.

I claim:

1. A data transmission system for transmitting data words between first and second system buses, said first system bus transmitting a first data word of a plurality of first bytes through a first system interface in synchronization with a first clock signal, and said second system bus transmitting a second data word of a plurality of second bytes through a second system interface in synchronization with a second clock signal, said data transmission system comprising:

a first memory for storing said first data word outputted from said first system bus through said first system interface, and for outputting to said first system bus a data word stored in said first memory through said first system interface;

a first latch for latching said first data word from said first memory in a first predetermined number of bytes equaling a first data word width of said first system bus;

a first selector for selecting the bytes latched in said first latch in a second predetermined number of bytes equaling a second data word width of said second system bus;

a second memory for outputting the bytes from said first selector through said second system interface to said second system bus and for storing said second data word outputted from said second system bus through said second system interface;

a second latch for latching said second data word from said second memory in a third predetermined number of bytes equaling said second data word width of said second system bus;

a second selector synchronized with said first clock signal, said second selector selecting the bytes latched in said second latch in a fourth predetermined number of bytes, equaling said first data word width of said first system bus, said second selector outputting the selected bytes to said first memory;

a first controller to control the latching of said first data word from said first system bus to said first memory, into said first latch, and for outputting of said second data word from said second selector to said first system bus through said first memory; and a second controller synchronized with said second clock signals, said second controller unit controlling outputting of said first data words from said first selector to said second system bus through said second memory, and for controlling outputting of said second data words from said second system bus to said second latch through said second memory wherein said first and second data word widths are different sizes.

2. The data transmission system of claim 1, wherein said first and second clock signals are asynchronous.

3. The data transmission system of claim 1, wherein said first memory is a FIFO buffer storing data having said first data word width of said first system bus.

4. The data transmission system of claim 1, wherein said second memory is a FIFO buffer storing data having a data word width of said second system bus.

5. A method for transmitting data in a data transmission system for transmitting data words of a plurality of bytes between first and second system buses which are respectively synchronized with first and second clock signals and respectively having different data word widths, said method comprising the steps of:

(1) converting a width of a data word from said first system bus into a width of a data word from of said second system bus, and outputting the converted data word to the second system bus wherein said step (1) comprises the steps of:

(1a) receiving the data word from said first system bus in synchronization with the first clock signal, and storing the received data to a first memory;

(1b) latching a plurality of bytes stored in said first memory in a first predetermined number of bytes equaling a first data word width of said first system bus in synchronization with said first clock signal, and (1c) selecting a second predetermined number of bytes equaling a second data word width of said second system bus among said latched bytes in synchronization with said second clock signal, storing the selected bytes to a second memory, and outputting the stored bytes to said second system bus; and (2) converting a width of a data word from said second system bus into a width of a data word of said first system bus and outputting the converted data word to the first system bus.

6. A data transmission method of claim 5, wherein said step (2) comprises the sub-steps of:

(2a) receiving a data word from said second system bus in synchronization with the second clock signal, and storing the received data to a second memory;

(2b) latching a plurality of bytes stored in said second memory in a third predetermined number of bytes in synchronization with said second clock signal; and (2c) selecting a fourth predetermined number of bytes among said latched bytes in synchronization with said first clock signal, storing the selected bytes to a first memory, and outputting the stored bytes to said first system bus.

7. The data transmission method of claim 6, wherein in said step (2b), a plurality of bytes are latched in a manner that a width of the bytes of data to be latched is equal to or greater than a width of the data word of said first second system bus.

8. The data transmission method of claim 6, wherein in the step (2c), said fourth predetermined number of bytes is selected to correspond to a data word width of the first system bus.

9. A system for bi-directional transfer of data between a first bus of n-byte data word width and a second bus of m-byte data word width, wherein n and m are integers, comprising:

a first storage arrangement to store n-byte data word from said first bus;

a second storage arrangement to store m-byte data word from said second bus;

means for controlling said first and second storage arrangements; and means for transferring m-bytes of data from said first storage arrangement to said second storage arrangement, and for transferring n-bytes of data from said second storage arrangement to said first storage arrangement, wherein said first storage arrangement comprises:

a first memory which stores n-byte data words;

a first interface to transfer n-byte data words from the first bus to said first memory; and a first latch coupled to said first memory and said transferring means, wherein said first latch has a first storage depth of a first prescribed number X (n/byte); and said transferring means includes a first selector coupled to said first latch and said second storage arrangement to select m-bytes of data, equaling said m-byte data word width of said second bus, from said first latch for transfer to said second storage arrangement.

10. The system of claim 9, wherein said transferring means further comprises:

a second selector coupled to said first and second storage arrangements such that said second selector selects n-bytes of data from said second storage arrangement for transfer to said first storage arrangement.

11. The system of claim 10, wherein said first storage arrangement and said first selector are responsive to a first clock signal, and said second storage arrangement and said second selector are responsive to a second clock signal.

12. The system of claim 11, wherein said first and second clock signals are asynchronous.

13. The system of claim 9, wherein n and m are different integers.

14. The system of claim 10, wherein said first storage arrangement comprises:

a second memory which stores m-byte data words;

a second interface to transfer m-byte data words from the second bus to said second memory; and a second latch coupled to said second memory and said second selector, wherein said second latch has a second storage depth of a second prescribed number X (m/byte).

* * * * *